VOICE FREQUENCY SIGNAL RECEIVERS

Filed March 24, 1954 3 Sheets-Sheet 1

Inventors
T. F. S. HARGREAVES
H. T. PRIOR
W. F. S. CHITTLEBURGH
By Philip M. Bolton
Attorney Sept 17, 1957 T. F. S. HARGREAVES ET AL 2,806,903

VOICE FREQUENCY SIGNAL RECEIVERS

Filed March 24, 1954 3 Sheets-Sheet 2

Inventors
T. F. S. HARGREAVES
H. T. PRIOR
W. F. S. CHITTLEBURGH
By Philip M. Bolton
Attorney Inventors
T F S HARGREAVES
H T PRIOR
W F S CHITTLEBURGH
By Philip M. Bolton
Attorney 2,806,903
Patented Sept. 17, 1957

2,806,903

VOICE FREQUENCY SIGNAL RECEIVERS

Thomas Frederick Stanley Hargreaves, Hector Thomas Prior, and William Francis Sidney Chittleburgh, London, England, assignors to International Standard Electric Corporation, New York, N. Y.

Application March 24, 1954, Serial No. 418,448

5 Claims. (Cl. 179—84)

This invention relates to a single frequency signal receiving equipment for use, for example, in the incoming limb of a 4-wire telecommunication system.

The arrangements described include the use of a high impedance valve and local terminations to the separate outlets, and also the use of a hybrid connection, and either arrangement alone may, in certain circumstances, give the requisite degree of immunity; both together give an enhanced effect.

The present invention provides signal receiving equipment for a single signalling frequency which comprises in combination: a thermionic valve amplifier adapted to receive wanted signals of the said single frequency and unwanted signals of other frequencies; signal responsive means connected to the output of the said amplifier adapted to respond preferentially to the said wanted signals and a relay for repeating said wanted signals; a guard circuit also connected to the output of the said amplifier means for preventing response of the said signal responsive means to the said unwanted signals, which means is arranged to be substantially insensitive to a band of frequencies which includes the said single frequency and also to odd harmonics of the said single frequency, and which comprises a rectifying arrangement for producing from other frequencies received a negative guarding voltage, means for applying said guarding voltage, in association with a permanent positive voltage bias, to the said amplifier means for reducing its gain in the presence of such other frequencies, whereby the response of said signal responsive means to frequencies other than those of wanted signals is prevented.

The invention will now be particularly described with reference to the accompanying drawing illustrating a preferred embodiment.

An object of the invention is to economise on panel and bay space in telecommunication equipment, and in the particular equipment to be described, a "voice-frequency demodulator amplifier" (i. e. a voice-frequency amplifier following a final demodulator stage in a carrier communication system), is replaced physically by a "demodulator amplifier plus V. F. receiver," thereby releasing for other use a whole bay of equipment (in the aggregate) formerly occupied by "V. F. receivers."

The equipment is not, of course, restricted to the above use in carrier communication systems, being usable in the incoming limb of any low frequency 4-wire communication system.

Figure 1:
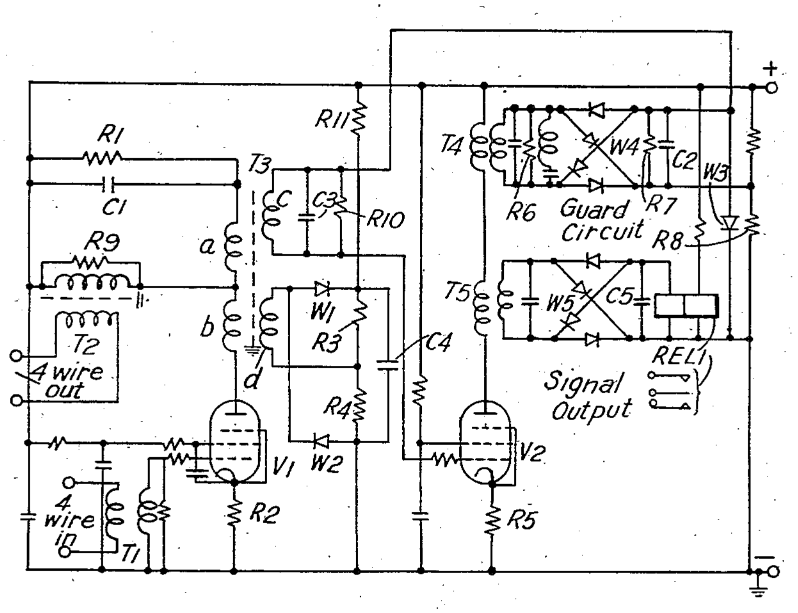
Fig. 1 is a schematic drawing of a complete receiving equipment.

Referring now to Fig. 1, the equipment shown therein comprises a voice-frequency amplifier (V1) for insertion in tandem in an incoming 4-wire limb between "in" and "out" terminals, and a voice-frequency signal receiver consisting of the equipment to the right of T3.

Signals incoming from the 4-wire line (or demodulator) are applied to the "in" terminals, whence they are transferred by transformer T1 to the control electrode of a pentode amplifier V1. In the anode circuit of the amplifier valve, a hybrid transformer T3 and an output transformer T2 are connected, effectively in series, and by making the input coil to the signalling receiver proper a hybrid coil in this way, a high attenuation is obtained between the speech output terminals (via T2) and the receiver (via T3).

Figure 2:
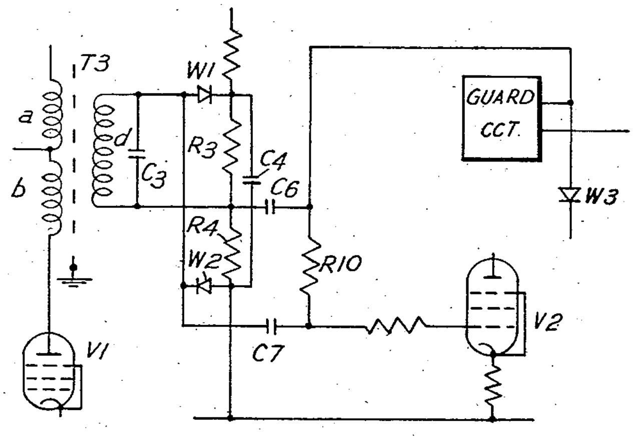
Fig. 2 is a fragmentary drawing, part of Fig. 1, showing an alternative arrangement.

The hybrid transformer T3 comprises a split primary winding (generally centre-tapped) shown as *a* and *b*, with, in this instance, two secondary windings *c* and *d*, although a single secondary winding can be used, as shown in Fig. 2. The junction of *a* and *b* is connected to the primary winding of the output transformer T2, the secondary of which is connected to the 4-wire extension via the terminals "out," the valve anode circuit consisting effectively of the primary winding of T2 and the winding *b* of T3 in series. The resistor R9 forms a local termination for the outgoing line via T2, and the resistor-condenser combination R1—C1 from the top end of T3 forms a hybrid network to balance the valve impedance.

By using a pentode valve as the amplifier and increasing its anode impedance—normally quite high—by negative feedback, in this instance by means of negative current feedback, from the undecoupled cathode bias resistor R2, the anode impedance may be made very high compared with the impedances presented in the anode circuit by T2 and T3, so that transfer coupling between T2 and T3 via the valve impedance can be made very small. This is only true if each local circuit (i. e. at T2 and T3) is locally terminated, preferably in its correct impedance (R9 for T2, and circuits on the secondaries of T3, for T3).

Attenuation between T2 and T3 for transfer of signal energy backwards from the "out" terminals is also secured by the properly balanced hybrid arrangement of T3 and the associated circuits, the only coupling then remaining being due to imperfections of balance resulting from impedance variations when valves are changed, or due to their ageing. The negative feedback provided helps in well-known manner by reducing the effects of such changes.

The signal receiver proper, to the right of T3 in Fig. 1, is fed from the winding *c* of T3, which may be given a flat response over the speech frequency band or may be broadly tuned to accentuate guard frequencies relative to signalling frequencies. In the present instance, the signalling frequency is 3 kc./s. and T3 is broadly tuned at 1 kc./s. Resistor R10 provides the main termination required, as referred to earlier, and the winding feeds the control electrode of an amplifier valve V2 at one terminal, being grounded at its other terminal via a low impedance A. C. circuit.

The winding *d* of transformer T3 is connected to a signal amplitude limiter circuit comprising rectifiers W1, W2, and resistors R3, R4. The resistors R3 and R4 with resistor R11 form a potentiometer across the anode battery which supplies both V1 and V2 from terminals + and —, and the potential at the junction of R3 and R11 determines the level to which signals will be limited. For all signals, the negative half cycles are limited to the negative voltage drop across the resistor R4 by the action of the rectifier W2, while the positive half-cycles are limited to the positive voltage drop across the resistor R3 by the action of the rectifier W1. Condenser C4 provides a low impedance path (to ground) for the current pulses carried by the rectifiers.

Some attenuation of the higher harmonics produced is also effected through the tuning of transformer T3 (by C3) but the tuning of T3 is not essential and is provided in this instance mainly to enable the transformer to be made smaller.

The limiter is so arranged that the voltage applied to the control electrode of V2 is such as to produce a further small amount of limiting by grid action in the tube, thus improving the overall limiting action and making efficient use of V2. It is important, however, that the bulk of the voltage limiting required should be done before V2 is reached, so that V2 is working at substantially constant voltage for ordinary signal level variations, a feature which is of importance to the proper functioning of the guard circuit.

After amplification in V2 to which, again, negative (current) feedback may be applied by means of an undecoupled cathode bias resistor R5, the signals are applied in the anode circuit to a guard circuit at transformer T4 and to a signal demodulator circuit at transformer T5, both in series.

The transformer T5 is tuned to the signalling frequency, and has a bandwidth (measured according to the usual criterion for simple resonant circuits) which is sufficient for the maximum sideband frequencies necessary for the signal impulsing speed required. The output of T5 is rectified in bridge rectifier W5 and smoothed in condenser C5 and then applied to one winding of signal relay Rel. 1. This relay is a telegraph type relay having a second biasing winding which carries a fixed biasing current derived from the anode battery in series with a suitable resistance. Fixed bias is permissible since the signal level applied to the relay is made nearly constant by the limiting actions already described.

The guard transformer T4 is broadly tuned with the object of obtaining sufficient suppression at the third harmonic of the signalling frequency—which harmonic is unavoidably generated (with others) by the limiting action of V2—so as to prevent undesired functioning of the guard circuit when genuine signals are being received. The secondary of T4 is also shunted by a series resonant circuit LC1, tuned to the signalling frequency, which suppresses the guard circuit at the signalling frequency itself.

Speech frequencies applied to T4 and intended to operate the guard circuit for preventing operation of the signal relay on spurious signalling frequencies present in such speech frequencies are rectified in bridge rectifier W4. After rectification, the guard voltage developed is applied to resistor-condenser combination R7—C2, the relationship between R6 (formerly mentioned), R7 and C2 being such as to satisfy well-known requirements of fast charging and relatively slow discharging in the guard circuit.

The guard circuit functions in association with rectifier W3 and resistor R8 to apply negative feedback to V2 when signalling frequency is present with speech frequencies, noise, etc. The lower end of R7—C2, carrying positive guard voltage, is connected to a point at a small positive potential to earth determined by the potential drop across R8, and the negative terminal of the guard voltage is applied to the control grid of V2 via winding *c* of T3, the rectifier W3 being so connected and poled as to prevent the upper end of R7 going positive.

Thus, when guard voltage is generated, negative voltage is fed back to the control grid of V2 to block the valve, and the gain is reduced to a value whereby any signalling frequency which might be present is insufficiently amplified to affect the relay.

Figure 4:
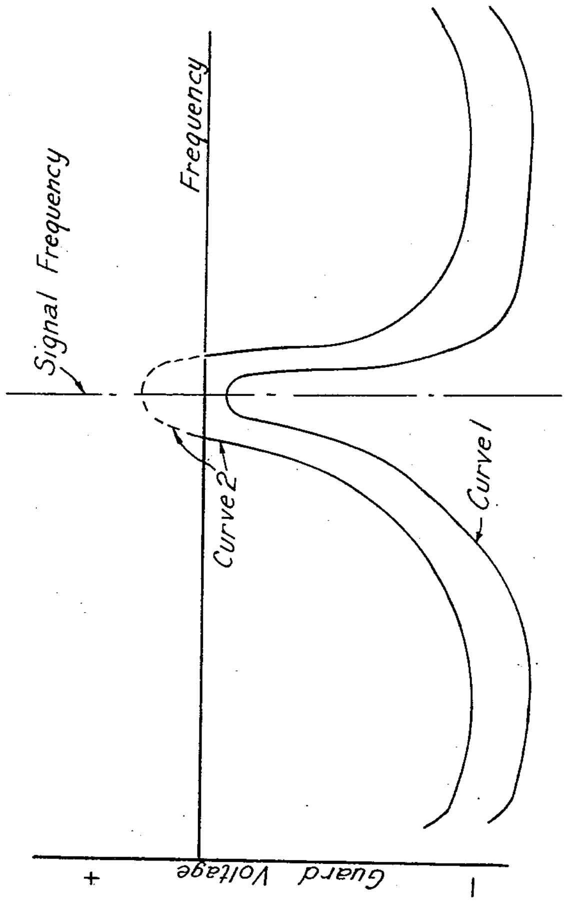
Fig. 4 shows curves of guard voltage v. frequency, to be referred to in the description.

The effect of rectifier W3 and the positive potential applied from R8 is illustrated by the graphs of Fig. 4. In this figure, curve 1 shows the guard voltage-frequency characteristic at the terminals of R7 and C2 in the absence of W3 and R8, the sharp drop in negative voltage (apparently a rise towards zero voltage) at the signalling frequency being due to LC1. However, the reduction of negative voltage fed-back so produced is not sufficient, either at the signalling frequency or in its vicinity. Hence, the W3—R8 combination is introduced to remedy this, the effect of which is shown in curve 2.

Curve 2 is identical in form with curve 1, but displaced upwards (towards positive voltages) by the amount of the small constant voltage added from R8, and shows the voltage which would appear at the upper end of R7 (relative to earth) in the absence of W3. The effect of W3 is to cut off the dashed portion of curve 2 so that a flat response of guard voltage is produced in the region of the signalling frequency, allowing a uniform response of the signal amplifier V2 to be achieved.

To revert to the function of the first limiter circuit for a moment: if the first limiter (W1, W2, R3, R4) were eliminated and the valve V2 were required to effect the whole of the signal limiting required, then the negative voltage fed-back from the guard circuit—which would be substantially independent of the signal level—would have to be effective in the presence of the whole permissible wide range of grid input signal levels. The guard circuit would then have to be unduly sensitive, and therefore sensitive to noise voltages, leading to the blocking of the receiver for genuine signals.

Figure 3:
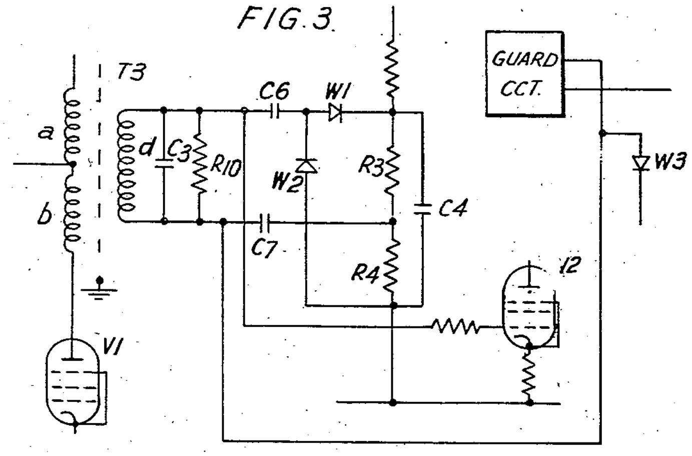
Fig. 3 shows a further alternative to that of Fig. 1.

Figs. 2 and 3 show small modifications whereby winding *c* of T3 may be eliminated, with a possible saving in transformer size. Fig. 3 is slightly to be preferred to Fig. 2, for reasons to be made clear in due course.

In the first embodiment (of Fig. 1) transformer T3 was provided with two secondary windings, *c* and *d*, of which winding *c* alone fed the amplifier V2, the winding *d* being used alone for signal limiting. In the modifications according to Figs. 2 and 3, the amplifier grid feed is taken from the limiter circuit (*d*), two different arrangements being shown in the two figures of the drawing.

In the first arrangement, of Fig. 2, winding *d* of T3 is shunted by a condenser C3 to give broad tuning at a frequency to enable guard frequencies to be accentuated relative to signalling frequencies, e. g. at 1 kc./s. when the signalling frequency is 3 kc./s., although tuning at this point is not essential. Resistor R10 constitutes both a load for the signalling frequency, via coupling condensers C6 and C7, and also a D. C. path to the grid of V2 for negative guarding voltages generated in the guard circuit.

The limiter circuit referred to is constituted by rectifiers W1 and W2, loaded by resistors R3 and R4, C4 providing a low impedance path to ground for the current pulses carried by the rectifiers.

In this arrangement, the only path to the grid of V2 for the guarding voltage is via R10, which may be a high resistance, and this arrangement might be undesirable in the presence of substantial amounts of grid current.

To avoid this effect, the arrangement shown in Fig. 3 may be used, and is, in fact, a preferable arrangement. Here the signal output circuit (which includes the guarding voltage circuit) is taken off before the rectifiers W1 and W2, so that R10 is connected directly across R3–*d* and is effectively by-passed for direct currents by this winding, while C6 and C7 insulate the limiting circuit from the guarding voltage.

In effect, Fig. 3 is the result of eliminating winding *d* rather than winding *c* of the original arrangement shown in Fig. 1 and adding the limiter circuit on to winding *c* via the condensers C6 and C7.

As a result, the former low impedance D. C. path to the grid via the transformer secondary winding for negative guarding voltages is restored, and large grid current potentials thereby prevented from building up.

These are different ways of achieving the same general result, although each may have its own individual advantages and characteristics. In general, the embodiment of Fig. 3 is to be preferred.

While the principles of the invention have been described above in connection with specific embodiments, and particular modifications thereof, it is to be clearly understood that this description is made only by way of example and not as a limitation on the scope of the invention.

What we claim is:

1. Signal receiving equipment for use in the incoming limb of a 4-wire telecommunication system which comprises in combination a first thermionic valve amplifier, means for connecting the input terminals of said amplifier to said incoming limb, a hybrid coil arrangement for connecting output terminals of said amplifier both to a signal receiver and to the extension of the said incoming limb, said signal receiver comprising a second thermionic valve amplifier and a voltage limiter, means adapted to supply signal current limited in the said limiter to the said second amplifier; further means in the said signal receiver which comprise signal responsive means adapted to be connected directly to said second amplifier and to render said guard circuit substantially insensitive to a specified signalling frequency band and to third harmonics thereof, rectifying means in said guard circuit adapted to produce from other frequencies received a negative guarding voltage, means adapted to apply said guarding voltage to the said second amplifier for reducing its gain, thus preventing response of said signal responsive means to frequencies other than frequencies within said frequency band, and means in said signal responsive means comprising a rectifier arrangement adapted to rectify signal current amplified in the said second amplifier, and a relay for responding to said rectified current.

2. Equipment according to claim 1, wherein said first and second amplifiers have high anode impedances to reduce substantially any coupling therebetween, matching impedance means adapted to terminate the said extension of the incoming limb, and other matching impedance means associated with the input circuit of said signal receiver.

3. Equipment as claimed in claim 1, comprising biasing means in the said guard circuit adapted to displace guarding voltages produced in the direction of positive voltages, and a rectifier means connected to the said guard circuit output terminals and adapted to suppress positively fedback guarding voltages.

4. Equipment as claimed in claim 1 and comprising in said voltage limiter a circuit network adapted to be connected to a secondary winding on the said hybrid coil, and means adapted to supply signal current to the said second thermionic amplifier direct from the terminals of the said voltage limiter.

5. Equipment as claimed in claim 4, and comprising circuit means adapted to feed back negative voltage from the said guard circuit to the said second amplifier via the said secondary winding to which the said limiter is connected.

References Cited in the file of this patent

UNITED STATES PATENTS

| | | |
|---|---|---|
| 2,282,131 | Hadfield | May 5, 1942 |
| 2,282,271 | Terroni et al. | May 5, 1942 |
| 2,654,002 | Hooijkamp et al. | Sept. 29, 1953 |
| 2,686,227 | Ryall | Aug. 10, 1954 |